Mar. 3, 1925.
E. L. SIMONS
ELECTRICAL FITTING
Filed Jan. 30, 1924
1,528,274
3 Sheets-Sheet 1
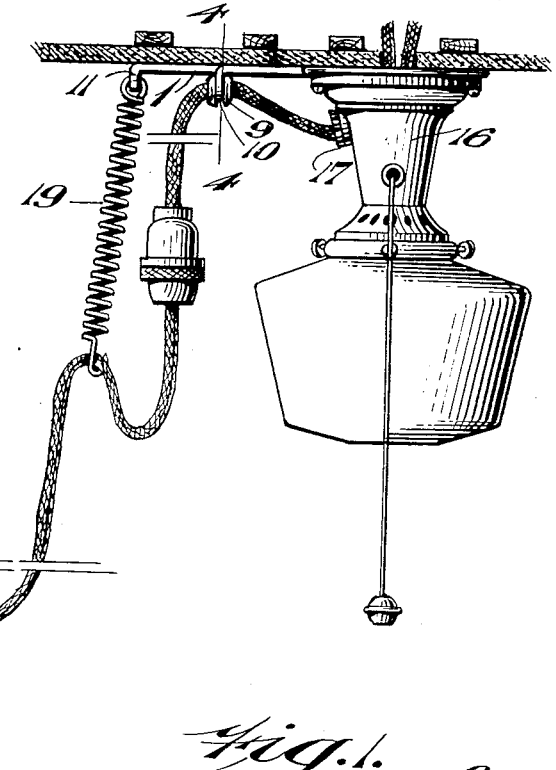
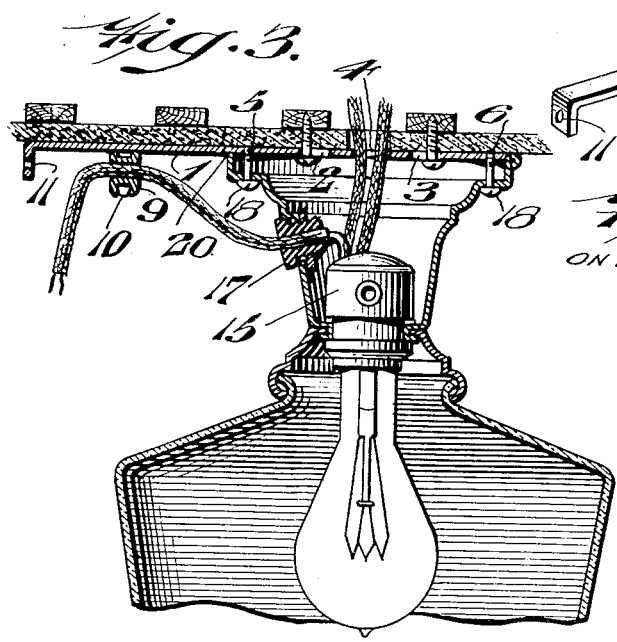
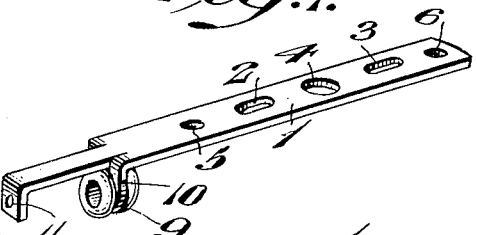
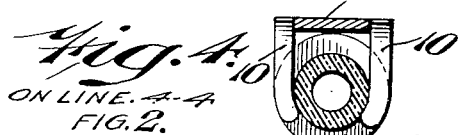
INVENTOR:
Edward L. Simons.
BY
ATTORNEYS

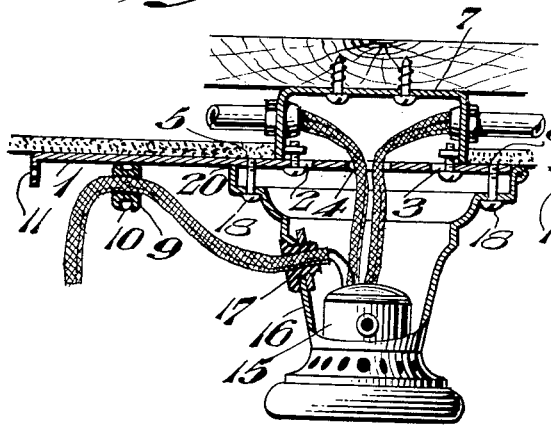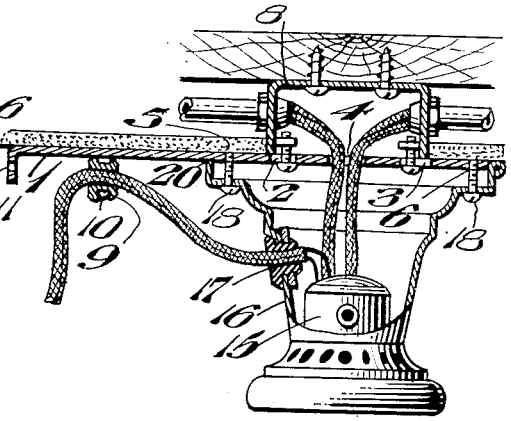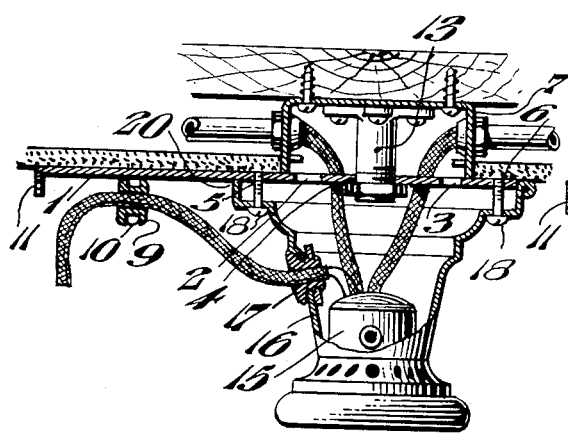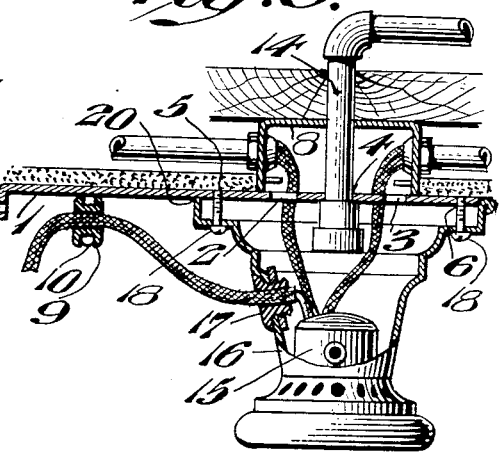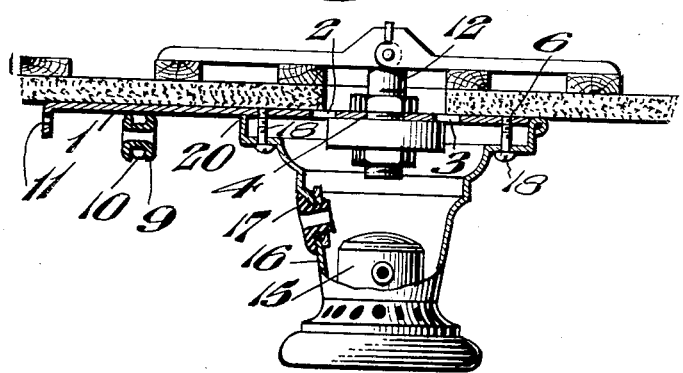

Mar. 3, 1925.
E. L. SIMONS
ELECTRICAL FITTING
Filed Jan. 30, 1924
1,528,274
3 Sheets-Sheet 3
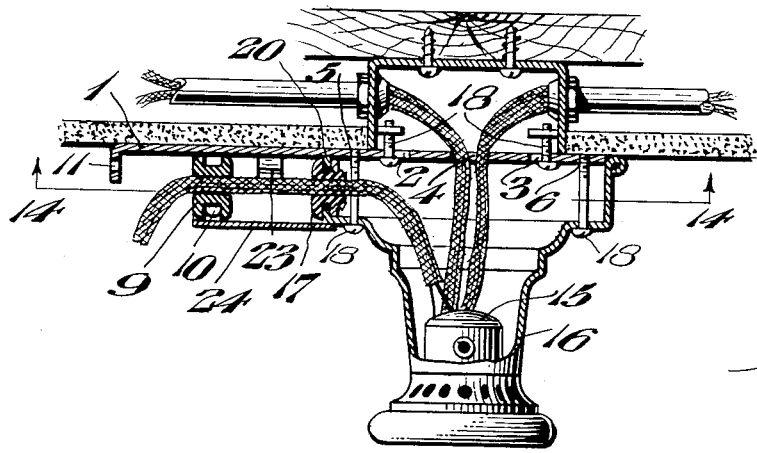
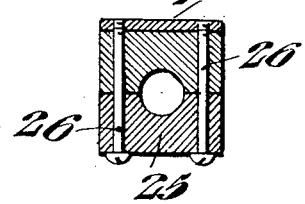
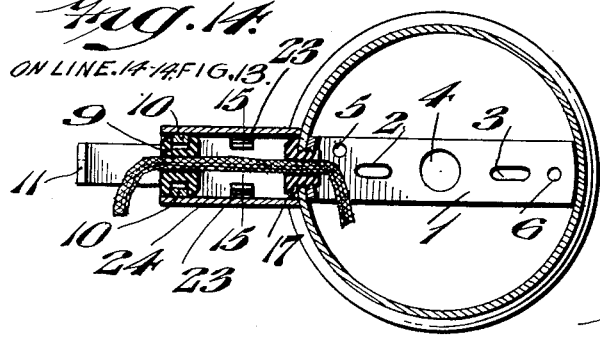
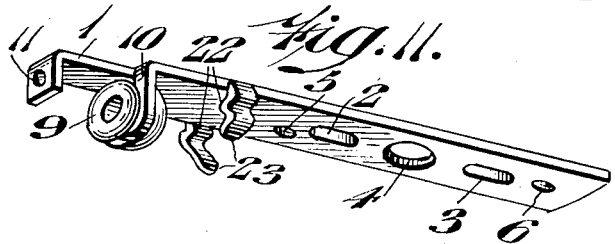
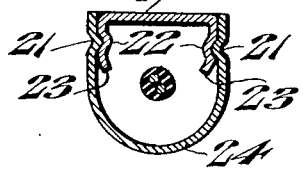
INVENTOR:
Edward L. Simons.
BY
ATTORNEYS.

Patented Mar. 3, 1925.

1,528,274

UNITED STATES PATENT OFFICE.

EDWARD L. SIMONS, OF LANSDOWNE, PENNSYLVANIA.

ELECTRICAL FITTING.

Application filed January 30, 1924. Serial No. 689,465.

*To all whom it may concern:*

Be it known that I, EDWARD L. SIMONS, a citizen of the United States, residing at Lansdowne, county of Delaware, State of Pennsylvania, have invented a new and useful Electrical Fitting, of which the following is a specification.

My invention consists of a novel electrical fitting adapted to facilitate the installation of ceiling outlets with permanent extension cords attached to the socket of the outlet.

My invention further consists of novel construction in such electrical fittings, adopted to support the extension cord in a yieldable manner and at the same time produce wiring which is both safe and of neat appearance.

With the above ends in view my invention consists of a novel supporting arm bar or plate also known as a "utility plate", so designed that it may be readily secured to the ceiling with any common type of wiring, and then permit the attachment thereto of the socket and canopy or any other fixture, and at the same time lend support to the extension cord.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 1 represents a perspective view of a novel electrical fitting or utility plate embodying my invention.

Figure 2 represents an elevation view partly in section, of an application of my invention.

Figure 3 represents a sectional view in elevation of a construction embodying my invention.

Figure 4 represents a sectional view on line 4—4 of Figure 2.

Figure 5 represents a perspective view of a modified form of support plate embodying my invention.

Figures 6 and 7 represent sectional views of an application of my invention to metal conduit construction where the sole means of support are the metallic outlet boxes.

Figure 8 represents a sectional view of an application of my invention to metallic outlet boxes containing a crowfoot.

Figure 9 represents a sectional view of an application of my invention to a wiring construction wherein a discontinued gas outlet pipe acts as the sole support for the fixture.

Figure 10 represents a sectional view of an application of my invention in combination with a toggle bolt.

Figure 11 represents a perspective view of a modification of my invention adapted to support dust proof cover.

Figure 12 represents perspective view of the dust proof cover.

Figure 13 represents a vertical sectional view of an application of the modified form of my invention.

Figure 14 represents a sectional view on line 14—14 of Figure 13.

Figure 15 represents a sectional view on line 15—15 of Figure 14.

Figure 16 represents a cross sectional view of a utility plate embodying a modified form of the invention.

Similar numerals of reference indicate corresponding parts.

Referring to the drawings numeral 1 designates my novel supporting arm or plate, having a body provided with elongated openings 2 and 3, a central opening 4, and tapped holes 5 and 6 located in longitudinal alignment. The elongated openings 2 and 3 are of sufficient length and so spaced that they will coincide with the holes in the screw lugs of the various sizes of metallic outlet boxes commonly used, such as the outlet boxes 7 and 8 in Figures 6 and 7 respectively. The central opening 4 is of sufficient diameter to permit the passage therethrough of standard piping used in gas installations, while the tapped holes 5 and 6 spaced substantially equidistant from the central opening 4 are adapted to receive machine screws, to secure the canopy or other fixture.

Adjacent to one end of the supporting arm or plate I provide the insulating bushing 9, held rigidly between the two arms 10, which are at a right angle to, and preferably integral with the plate; as shown in Figures 1, 4 and 5. At the extreme end of the plate adjacent to the insulating bushing, I provide the spring supporting eyelet 11, integral with the plate 1.

The application of my novel supporting arm or utility plate to the various types of electrical installation, is as follows:—I first secure or attach the plate to the surface of the ceiling, through either the elongated openings 2 and 3 or the central opening 4. If the wires are brought through without the aid of an outlet box, as in Figures 3 and 10; I may simply secure the plate with two wood screws passing through the elongated openings 2 and 3, into the lath behind the plaster, as shown in Figure 3; or I may attach it by means of a toggle bolt 12 passing through the central opening 4 as shown in Figure 10. In installations employing outlet boxes I may secure the plate either to the screw lugs as shown in Figures 6 and 7 and 13; or to a crowfoot 13 or gas pipe stud 14 passing through the central opening 4, as shown in Figures 8 and 9 respectively. Having secured the plate, I next connect the line wires as well as the extension cord to the socket 15 within the canopy 16 and pass the cord through the insulating bushing 9 as well as the bushing 17. Lastly I secure the canopy to the supporting plate by means of the machine screws 18 threaded into the tapped holes 5 and 6. In order that the upper edge of the canopy may contact with the ceiling throughout its circumference, and thereby exclude dust from within the canopy; I provide a recess 20 in one side of the upper edge of the canopy; of the proper depth and width to permit the plate 1 to rest therein.

If in addition to the support given to the extension cord by the insulating bushing 9, a yieldable support is desired to take up the excess length of the extension cord, I interpose a helical tension spring 19 between some point along the length of the extension cord and the eyelet 11, as shown in Figure 2. By this means, any electrical appliance attached to the extension cord, such as an electrically heated iron shown in Figure 2, may be moved about within a relatively large radius, without being hindered by an excessive length of the cord at any time.

In order to protect the insulating bushings 9 and 17, and the cord I may provide the protecting cover 24 to conceal the bushings cord as shown in Figures 12 to 15 inclusive. The cover is supported by the engagement of the two inwardly extending protuberances 21 with the notches 22 on supporting prongs 23, which are integral with the plate 1.

The major length of the utility plate is contained within or concealed by the canopy or other fixture, so that in case the plate is removed or disconnected from the ceiling for any purpose, the points of attachment of said plate thereto are not visible and the marring of the ceiling is not visible.

In Figure 16, the plate 1, differs from the other plates shown only in that the apertured member of insulating material is in the form of a clamp 25 secured to plate 1 by means of rivets or screws 26. The clamp may be in one or two pieces as desired.

It is thus apparent that by my novel provision of a cord supporting arm or utility plate detachably connected to and projecting laterally from the canopy of a lighting fixture, the upper edge of which canopy abuts against the ceiling, a permanent extension cord from said lighting fixture to a household implement, as an electric sad iron, toaster, or coffee pot may be supported and positioned below said arm with respect to the bowl of the lighting fixture so as to hang free and clear of such bowl which is normally highly heated when the light in the fixture is lit.

It will now be apparent that I have devised a novel and useful construction which embodies the features of advantage enumerated as desirable in the statement of the invention and the above description and while I have in the present instance shown and described the preferred embodiments thereof which have been found in practice to give satisfactory and reliable results, it is to be understood that the same are susceptible of modification in various particulars without departing from the spirit or scope of the invention or sacrificing any of its advantages.

Having thus described my invention what I claim as new and desire to secure by Letters Patent, is:—

1. In an electrical fitting, a supporting plate having a plurality of spaced openings therein, an eyelet at one extremity of said plate and a bushing secured to one side of said plate adjacent to said eyelet.

2. In an electrical fitting, a supporting plate having plurality of spaced openings therein in longitudinal alignment, an eyelet at one extremity of said plate and an insulating bushing secured to one side of said plate, adjacent to said eyelet, by means of arms integral with and at an angle to said plate.

3. In an electrical fitting, a supporting plate having a plurality of spaced openings therein, an eyelet at one extremity of said plate, a bushing secured to one side of said plate adjacent said eyelet, and supporting prongs adjacent said bushing.

4. In an electrical fitting, a supporting plate having a plurality of openings therein, an eyelet at one extremity of said plate, a bushing secured to one side of said plate adjacent said eyelet, and notched supporting prongs adjacent said bushing and integral with and at an angle to said plate.

5. In an electrical fitting, a supporting plate having a plurality of openings therein, a bushing secured to one side of said plate adjacent one end thereof; supporting prongs adjacent said bushing, and a protecting cover engaged by said prongs and adapted to conceal said bushing.

6. In an electrical fitting, a supporting plate, a plurality of openings therein, a bushing secured to one side of said plate adjacent one end thereof, supporting prongs adjacent said bushing and having notches in the sides thereof, and a protecting cover having inwardly extending protuberances along the sides thereof, engaging with the said notches, and adapted to conceal said bushing.

7. In an electrical fitting, a supporting plate, a plurality of spaced openings therein in longitudinal alignment, an eyelet at one extremity of said plate; an insulating bushing secured to one side of said plate and adjacent to said eyelet; supporting prongs adjacent said bushing and integral with and at an angle to said plate, and having notches in the sides thereof, and a protecting cover having inwardly extending protuberances along the sides thereof engaging said notches, said cover being adapted to conceal said bushing.

8. In an electrical fitting, a supporting plate having a plurality of openings therethrough, said plate terminating at one end in an electrical cord supporting extension, and an apertured member of insulating material secured to said plate adjacent said extension.

9. In a device of the character described, a detachable utility plate adapted to be carried by and connected with the upper portion of the canopy of an electric light fixture having a cord-receiving opening below its supporting member, one end of said plate being adapted to be contained within said canopy, and the other end projecting laterally beyond said canopy and having an outer terminal portion provided with supporting and guiding means for an extension cord, whereby the latter is positioned wholly below said plate and adapted to hang clear of the shade carried by said canopy.

10. In a device of the character stated, a canopy for an electric lighting fixture, whose upper end is adapted to abut against a ceiling, a utility plate having a plurality of spaced openings and positioned in the upper part of said canopy and interposed between said canopy and ceiling and having its body contained within said canopy, and its outer end projecting laterally beyond said canopy and positioned between the latter and said ceiling, an extension cord located wholly below said plate and projecting outwardly from said fixture at a point below said plate beyond said canopy, a deflected terminal near the outer end of said plate and adapted to guide and support said extension cord, whereby the latter is positioned to hang wholly below said plate and clear of the shade carried by said canopy, and fastening devices common to said canopy and utility plate.

11. In an electrical fitting, a supporting plate having a plurality of spaced apart openings, said plate having spaced-apart means depending therefrom, and a bushing embraced and held by said depending means, the axis of the bore of the bushing extended substantially lengthwise of the said plate.

In witness whereof, I have hereunto signed my name.

EDWARD L. SIMONS.

Witnesses:
E. HAYWARD FAIRBANKS,
N. BUSSINGER.